United States Patent
Gou et al.

(10) Patent No.: US 12,232,130 B2
(45) Date of Patent: Feb. 18, 2025

(54) SIGNAL TRANSMISSION METHOD AND DEVICE, NETWORK APPARATUS, AND STORAGE MEDIUM

(71) Applicant: ZTE Corporation, Shenzhen (CN)

(72) Inventors: Wei Gou, Shenzhen (CN); Peng Hao, Shenzhen (CN); Xianghui Han, Shenzhen (CN); Yu Ngok Li, Hong Kong (CN)

(73) Assignee: ZTE Corporation, Shenzhen (CN)

( * ) Notice: Subject to any disclaimer, the term of this patent is extended or adjusted under 35 U.S.C. 154(b) by 359 days.

(21) Appl. No.: 17/631,609

(22) PCT Filed: Jul. 21, 2020

(86) PCT No.: PCT/CN2020/103194
§ 371 (c)(1),
(2) Date: Jan. 31, 2022

(87) PCT Pub. No.: WO2021/017942
PCT Pub. Date: Feb. 4, 2021

(65) Prior Publication Data
US 2022/0279569 A1    Sep. 1, 2022

(30) Foreign Application Priority Data
Jul. 31, 2019   (CN) .......................... 201910706591.7

(51) Int. Cl.
*H04W 72/23*    (2023.01)
*H04L 1/00*    (2006.01)
(Continued)

(52) U.S. Cl.
CPC ........... *H04W 72/23* (2023.01); *H04L 1/1812* (2013.01); *H04L 5/0053* (2013.01);
(Continued)

(58) Field of Classification Search
CPC ............... H04W 72/23; H04W 72/542; H04W 72/0446; H04W 72/0453; H04W 72/1273; H04L 1/1812; H04L 5/0053
(Continued)

(56) References Cited

U.S. PATENT DOCUMENTS

2018/0227882 A1    8/2018    Freda et al.
2019/0103943 A1*   4/2019    Wang ................... H04L 1/1854
(Continued)

FOREIGN PATENT DOCUMENTS

| CN | 107006003 A | 8/2017 |
| CN | 111092704 A | 5/2020 |

(Continued)

OTHER PUBLICATIONS

Japanese office action issued in JP Patent Application No. 2022-506549, dated Dec. 12, 2023, 5 pages. English translation included.
(Continued)

*Primary Examiner* — Xuan Lu
(74) *Attorney, Agent, or Firm* — Perkins Coie LLP (57) ABSTRACT

Provided are a signal transmission method and device. The signal transmission method includes: sending an uplink (UL) grant to a terminal, where the UL grant is used for indicating a change in a transmission mechanism of a signal and/or a change in a resource for a signal.

16 Claims, 4 Drawing Sheets

Receive a first physical downlink control channel (PDCCH) — S41

Transmit a resource according to a signal transmission mode indication in the first PDCCH — S42

(51) Int. Cl.
    *H04L 1/1607*     (2023.01)
    *H04L 1/1812*     (2023.01)
    *H04L 1/1829*     (2023.01)
    *H04L 1/1867*     (2023.01)
    *H04L 5/00*     (2006.01)
    *H04W 72/0446*     (2023.01)
    *H04W 72/0453*     (2023.01)
    *H04W 72/1273*     (2023.01)
    *H04W 72/542*     (2023.01)

(52) U.S. Cl.
    CPC ... *H04W 72/0446* (2013.01); *H04W 72/0453* (2013.01); *H04W 72/1273* (2013.01); *H04W 72/542* (2023.01)

(58) Field of Classification Search
    USPC .......................................................... 370/329
    See application file for complete search history.

(56) References Cited

U.S. PATENT DOCUMENTS

| | | | |
|---|---|---|---|
| 2019/0173622 A1 | 6/2019 | Xiong et al. | |
| 2020/0145143 A1* | 5/2020 | Nemeth | H04L 1/1819 |
| 2020/0145167 A1* | 5/2020 | Jung | H04L 5/0055 |

FOREIGN PATENT DOCUMENTS

| | | |
|---|---|---|
| EP | 3716520 B1 | 5/2022 |
| WO | 2018146229 A1 | 8/2018 |
| WO | 2018231728 A1 | 12/2018 |
| WO | 2019032748 A1 | 2/2019 |

OTHER PUBLICATIONS

Korean office action issued in KR Patent Application No. 10-2022-7004259, dated Dec. 22, 2023, 6 pages. English translation included.
Qualcomm Incorporated, "Summary of remaining issues for overlapping UL transmissions," 3GPP TSG RAN WG1 Meeting #93, R1-1807820, Busan, Korea, May 21-25, 2018, 15 pages.
Mediatek Inc., "Multiple HARQ procedures and intra-UE UCI prioritization," 3GPP TSG RAN WG1 Meeting #97, R1-1906566, Reno, Nevada, USA, May 13-17, 2019, 11 pages.
International Search Report for corresponding application PCT/CN2020/103194 filed Jul. 21, 2020; Mail date Sep. 29, 2020.
Mediatek Inc, "Multiple HARQ procedures and intra-UE UCI prioritization", R1-1907724, 3GPP TSG RAN WG1 Meeting #97, May 16, 2019.
OPPO. "Consideration on UL intra UE Tx prioritization and multiplexing", R1-1808911, 3GPP TSG RAN WG1 Meeting #94, Aug. 10, 2018.
European Search Report issued in EP Patent Application No. 20846957.7, dated Aug. 4, 2023, 7 pages.
Sony, "Multiple HARQ-ACK PUSCH transmissions in a slot," 3GPP TSG RAN WG1 #96bis, R1-1904235, Xi'an, China, Apr. 8-12, 2019, 5 pages.
Japanese office action issued in JP Patent Application No. 2022-506549, dated Mar. 7, 2023, 9 pages. English translation included.
OPPO, "UCI enhancements for URLLC," 3GPP TSG RAN WG1 #97, R1-1906448, Reno, USA, May 13-17, 2019, 8 pages.
NEC, "Enhanced inter-UE Tx prioritisation and multiplexing," 3GPP TSG RAN WG1 #96bis, R1-1904224, Xi'an, China, Apr. 8-12, 2019, 4 pages.
LG Electronics, "Discussion on UL inter UE Tx prioritization," 3GPP TSG RAN WG1 Meeting #94, R1-1808532, Gothenburg, Sweden, Aug. 20-24, 2018, 6 pages.
Wilus Inc., "On UL inter-UE multiplexing for eURLLC," 3GPP TSG RAN WG1 Ad-Hoc Meeting 1901, R1-1901012, Taipei, Taiwan, Jan. 21-25, 2019, 4 pages.
Japanese final office action and denial of entry of amendment issued in JP Patent Application No. 2022-506549, dated Jul. 11, 2024, 7 pages. English translation included.
Chinese office action issued in CN Patent Application No. 201910706591.7, dated Apr. 27, 2024, 24 pages. English translation included.
Korean office action issued in KR Patent Application No. 10-2022-7004259, dated Aug. 22, 2024, 5 pages. English translation included.
Chinese Notification to Complete Formalities of Registration issued in CN Patent Application No. 201910706591.7, dated Sep. 13, 2024, 4 pages. English translation included.
European Communication pursuant to Article 94(3) EPC issued in EP Patent Application No. 20846957.7, dated Oct. 17, 2024, 6 pages.

* cited by examiner

SIGNAL TRANSMISSION METHOD AND DEVICE, NETWORK APPARATUS, AND STORAGE MEDIUM

CROSS-REFERENCES TO RELATED APPLICATIONS

This application is a national stage application filed under 35 U.S.C. 371 based on International Patent Application No. PCT/CN2020/103194, filed on Jul. 21, 2020, which claims priority to Chinese Patent Application No. 201910706591.7 filed with the China National Intellectual Property Administration (CNIPA) Jul. 31, 2019, the disclosures of which are incorporated herein by reference in their entireties.

TECHNICAL FIELD

The present application relates to the field of communications, for example, a signal transmission method and device, a network apparatus, and a storage medium.

BACKGROUND

5th-Generation New Radio (5G NR) is the global 5G standard of new radio design based on orthogonal frequency division multiplexing (OFDM) and is also a very important foundation of the next-generation cellular mobile technology. In NR, Ultra-Reliable Low-Latency Communications (URLLC) traffic is introduced, and such traffic requires high transmission reliability and timeliness. Enhanced Mobile Broadband (eMBB) traffic requires lower transmission reliability and timeliness than URLLC traffic. Therefore, in transmission, compared with the eMBB traffic, the URLLC traffic is assigned to a higher priority for transmission, and similarly, a hybrid automatic repeat request acknowledgement (HARQ-ACK) codebook corresponding to the URLLC traffic also has a higher priority than a HARQ-ACK codebook corresponding to the eMBB traffic.

Therefore, in an uplink (UL) slot, when a physical uplink control channel (PUCCH) of the HARQ-ACK codebook corresponding to an eMBB traffic and a PUCCH of the HARQ-ACK codebook corresponding to a URLLC traffic overlap in the time domain (including partially overlapping in the time domain), in order to ensure the transmission of resources for the two codebooks, it is necessary to provide a reliable method that can prevent the transmission of the low-priority resources from affecting the reliability and timeliness of the high-priority resources and enable the low-priority resources to be transmitted appropriately.

SUMMARY

An embodiment of the present application provides a signal transmission method. The method includes the following.

A UL grant is sent.

The UL grant is used for indicating a change in a transmission mechanism of the signal and/or a change in a resource for the signal.

An embodiment of the present application provides a signal transmission method. The method includes the following.

A UL grant is received.

A signal is transmitted according to the UL grant.

The UL grant is used for indicating a change in a transmission mechanism of the signal and/or a change in a resource for the signal.

An embodiment of the present application provides a signal transmission method. The method includes the following.

A first PDCCH is sent.

The first PDCCH is used for indicating a change in a resource for a signal.

An embodiment of the present application provides a signal transmission method. The method includes the following.

A first PDCCH is received.

A resource is transmitted according to a signal transmission mode indication in the first PDCCH.

The first PDCCH is used for indicating a change in a resource for a signal.

An embodiment of the present application provides a signal transmission device. The device includes a first sending module.

The first sending module is configured to send a UL grant.

The UL grant is used for indicating a change in a transmission mechanism of the signal and/or a change in a resource for the signal.

An embodiment of the present application provides a signal transmission device. The device includes a first receiving module and a first transmitting module.

The first receiving module is configured to receive a UL grant.

The first transmission module is configured to transmit a signal according to the UL grant.

The UL grant is used for indicating a change in a transmission mechanism of the signal and/or a change in a resource for the signal.

An embodiment of the present application provides a signal transmission device. The device includes a second sending module.

The second sending module is configured to send a first PDCCH.

The first PDCCH is used for indicating a change in a resource for a signal.

An embodiment of the present application provides a signal transmission device. The device includes a second receiving module and a second transmission module.

The second receiving module is configured to receive a first PDCCH.

The second transmission module is configured to transmit a resource according to a signal transmission mode indication in the first PDCCH.

The first PDCCH is used for indicating a change in a resource for the signal.

An embodiment of the present application provides a signal transmission system that includes the signal transmission device provided by any one of the embodiments of the present application.

An embodiment of the present application provides a communication system that includes a terminal provided by an embodiment of the present application and a base station provided by an embodiment of the present application.

An embodiment of the present application provides a storage medium. The storage medium is configured to store a computer program that, when executed by a processor, implements the method provided by any one of the embodiments of the present application.

The embodiments of the present application can change the sending mechanism or resource for the signal by using parameters, thereby improving the transmission reliability of a single signal. For the transmissions of multiple signals that may conflict with each other, the embodiments of the present application can also avoid signal discarding caused by conflict avoidance.

DETAILED DESCRIPTION

Embodiments of the present application are described hereinafter in detail in conjunction with the drawings. It is to be noted that if not in collision, the embodiments described herein and the features thereof may be combined with each other.

Figure 1:
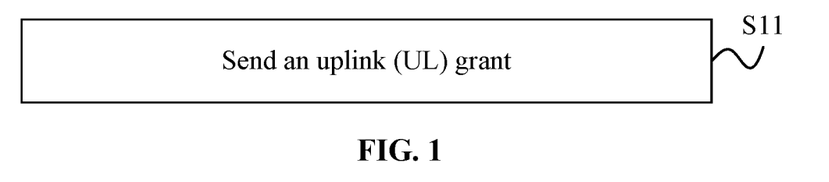
FIG. 1 is a flowchart of a signal transmission method according to an embodiment of the present application.

FIG. 1 is a flowchart of a signal transmission method according to an embodiment of the present application. As shown in FIG. 1, the method may include S11.

In S11, a UL grant is sent.

The UL grant is used for indicating a change in a transmission mechanism of the signal and/or a change in a resource for the signal.

In an embodiment, the resource for the signal is a resource used for transmitting the signal, such as a time domain resource or a frequency domain resource.

In an embodiment, the UL grant may be a PDCCH or downlink control information (DCI) for scheduling a physical uplink shared channel (PUSCH).

In an embodiment, the UL grant is used for indicating a change in the transmission mechanism of the signal.

In an embodiment, the UL grant is used for indicating a change in the resource for transmitting the signal.

In an embodiment, the UL grant is used for indicating a change in the transmission mechanism of the signal and a change in the resource for transmitting the signal.

In a specific example, the transmission channel of the signal overlaps or partially overlaps with the transmission channel of another signal in the time domain, and the priority of the signal is lower than the priority of the another signal.

In another specific example, the transmission channel of the signal does not overlap or partially overlap with the transmission channel of any other signal in the time domain.

In a specific example, the transmission mechanism of the signal and the resource for transmitting the signal are configured by a base station.

In a specific example, the change in the transmission mechanism of the signal is indicated by setting one or more parameters in the UL grant to specific values.

In a specific example, the change in the resource for transmitting the signal is indicated by setting one or more parameters in the UL grant to specific values.

In a specific example, the change in the transmission mechanism of the signal and the change in the resource for transmitting the signal are indicated by setting one or more parameters in the UL grant to specific values.

In an embodiment, an uplink shared channel (UL-SCH) indicator in the UL grant is 0, and a channel state information (CSI) request in the UL grant is 0.

In an embodiment, the UL-SCH indicator in the UL grant is 0, the CSI request in the UL grant is 0, and the cyclic redundancy check (CRC) bit of the UL grant is scrambled by a semi-persistent channel state information radio network temporary identity (SP-CSI-RNTI).

In the related art, it indicates an error condition that the UL-SCH indicator in the UL grant is 0 and the CSI request is 0 (and the CRC bit of the UL grant is scrambled by the SP-CSI-RNTI), and this setting is forbidden. In the embodiment of the present application, the values of the forbidden parameters in the UL grant are used for indicating a change in the transmission mechanism of the signal and/or a change in the resource for transmitting the signal, which does not affect the function of the original parameters in the UL grant, so that there is no impact on the related art because the above-mentioned parameters with above-mentioned values do not appear in the related art. The CSI request includes multiple bits, and the CSI request being 0 may mean that all bits of this parameter are set to 0.

In an embodiment, except for a redundant version (RV) and a hybrid automatic repeat request identifier (HARQ-ID), parameters in the UL grant are valid parameters.

In a specific example, the combination of parameters in the UL grant may be redefined, and the combination of redefined parameters is used for indicating the change in the transmission mechanism of the signal and/or the change in the resource for transmitting the signal.

In an embodiment, the RV and the UL-SCH indicator in the UL grant may be redefined to indicate the change in the transmission mechanism of the signal and/or the change in the resource for transmitting the signal. For example, the length of the RV is 2 bits, one or more bits in the RV are agreed to be used, and one of the multiple value states of the one or more bits is agreed to be used for representing that the UL grant requires at least the change of the original transmission mechanism of the to-be-transmitted signal and/or the original resource for transmitting the signal. For example, the length of the RV is 2 bits, and one of the four value states "00", "01", "10" and "11" of the RV is agreed to be used for representing that the UL grant indicates at least the change of the original transmission mechanism of the signal and/or the original resource for transmitting the signal.

In an embodiment, the UL-SCH indicator and the HARQ-ID in the UL grant may be redefined to indicate the change in the transmission mechanism of the signal and/or the change in the resource for transmitting the signal. For example, the length of the HARQ-ID is 4 bits, one or more bits in the HARQ-ID are agreed to be used, and one of the multiple value states of the one or more bits is agreed to be used for representing that the UL grant requires at least the change of the original transmission mechanism of the to-be-transmitted signal and/or the original resource for transmitting the signal.

In an embodiment, the UL-SCH indicator, the RV and the HARQ-ID in the UL grant may be redefined to indicate the change in the transmission mechanism of the signal and/or the change in the resource for transmitting the signal. For example, the total length of the RV and the HARQ-ID is 6 bits, one or more bits in the 6 bits are agreed to be used, and one of the multiple value states of the one or more bits is agreed to be used for representing that the UL grant indicates at least the change of the original transmission mechanism of the signal and/or the original resource for transmitting the signal.

In the UL grant, except for the parameters that may be redefined to represent that the UL grant indicates the change of the transmission mechanism of the signal and/or the change of the resource for transmitting the signal, other parameters in the UL grant (for example, except for the above-mentioned reinterpreted parameters, parameters in the DCI for scheduling the PUSCH in TS38.212Vf50 version, in particular, a modulation and coding scheme, a beta_offset indicator, and a time domain resource assignment) may maintain their original meanings and are also valid and do not need to be reinterpreted. According to the indication of other valid parameters in the UL grant, a user equipment (UE) transmits the signal in a mode indicated by other valid parameters in the UL grant, and at this point, the signal is transmitted through the PUSCH indicated by the UL grant (and there is no uplink data in the PUSCH). The original PUCCH transmission mechanism and the original PUCCH resource for the signal are discarded.

In an embodiment, the transmission mechanism includes at least one of: transmission of the signal through a PUCCH or transmission of the signal through a PUSCH.

The resource includes at least one of: a time domain resource used by the signal, a frequency domain resource used by the signal, a codeword resource used by the signal or a beam resource used by the signal.

The time domain resource includes at least one of: a slot location, a sub-slot location or a symbol location, and the frequency domain resource includes at least one of: a physical resource block (PRB) location, a bandwidth part (BWP) location or a carrier location.

In an embodiment, the signal includes one of: a HARQ-ACK codebook, a scheduling request (SR), CSI or UE data.

The signal transmission method provided by this embodiment of the present application is not only applicable to the scenario where two channels overlap in the time domain, but also applicable to the scenario where there is only a single channel. The essence of the method is to change the original transmission mechanism and/or transmission resource for a signal, regardless of the cause for change.

In an embodiment, in a case where the signal is the HARQ-ACK codebook, the UL grant is used for indicating that the transmission of the HARQ-ACK codebook through a PUCCH is changed into the transmission of the HARQ-ACK codebook through a PUSCH scheduled by the UL grant.

Figure 2:
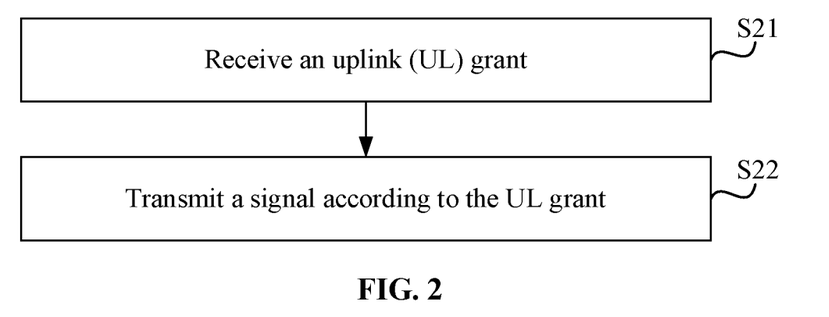
FIG. 2 is a flowchart of a signal transmission method according to another embodiment of the present application.

FIG. 2 is a flowchart of a signal transmission method according to another embodiment of the present application. As shown in FIG. 2, the method includes S21 and S22.

In S21, a UL grant is received.

In S22, a signal is transmitted according to the UL grant.

The UL grant is used for indicating a change in a transmission mechanism of the signal and/or a change in a resource for the signal.

In an embodiment, a UL-SCH indicator in the UL grant is 0, and a CSI request in the UL grant is 0.

In an embodiment, the UL-SCH indicator in the UL grant is 0, the CSI request in the UL grant is 0, and the CRC bit of the UL grant is scrambled by a SP-CSI-RNTI.

In an embodiment, except for the RV and the HARQ-ID, parameters in the UL grant are valid parameters.

In an embodiment, the transmission mechanism includes at least one of: transmission of the signal through a PUCCH or transmission of the signal through a PUSCH.

The resource includes at least one of: a time domain resource used by the signal, a frequency domain resource used by the signal, a codeword resource used by the signal or a beam resource used by the signal.

The time domain resource includes at least one of: a slot location, a sub-slot location or a symbol location, and the frequency domain resource includes at least one of: a PRB location, a BWP location or a carrier location.

In an embodiment, the signal includes one of: a HARQ-ACK codebook, an SR, CSI or UE data.

In an embodiment, in a case where the signal is the HARQ-ACK codebook, the UL grant is used for indicating that the transmission of the HARQ-ACK codebook through a PUCCH is changed into the transmission of the HARQ-ACK codebook through a PUSCH scheduled by the UL grant.

Figure 3:
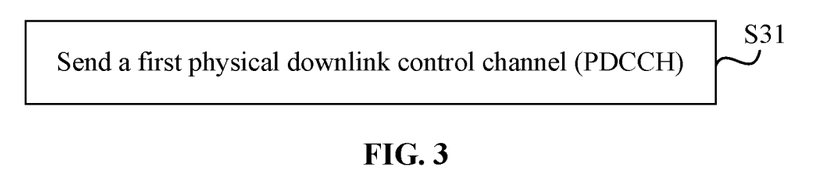
FIG. 3 is a flowchart of a signal transmission method according to another embodiment of the present application.

FIG. 3 is a flowchart of a signal transmission method according to another embodiment of the present application. As shown in FIG. 3, the method may include S31.

In S31, a first PDCCH is sent.

The first PDCCH is used for indicating a change in a resource for the signal.

In an embodiment, the resource for the signal may refer to a resource for transmitting the signal.

In an embodiment, the transmission channel of the signal overlaps or partially overlaps with the transmission channel of another signal.

In an embodiment, the resource includes at least one of: a time domain resource used by the signal, a frequency domain resource used by the signal, a codeword resource used by the signal or a beam resource used by the signal.

The time domain resource includes at least one of: a slot location, a sub-slot location or a symbol location, and the frequency domain resource includes at least one of: a PRB location, a BWP location or a carrier location.

In an embodiment, the signal includes one of: a HARQ-ACK codebook, an SR, CSI or UE data.

In an embodiment, in a case where the signal is the HARQ-ACK codebook, the value of a downlink assignment index (DAI) counter of the first PDCCH is set to the value of a DAI counter of a second PDCCH.

The second PDCCH is the last PDCCH of PDCCHs corresponding to at least one PDSCH corresponding to the HARQ-ACK codebook.

In an embodiment, a new resource used for transmitting the signal is present in the first PDCCH.

In a case where the signal is the HARQ-ACK codebook, the location of a UL slot (or uplink sub-slot) in which the HARQ-ACK codebook is transmitted and/or a PUCCH resource by which the HARQ-ACK codebook is transmitted are indicated by the first PDCCH.

In a case where the signal is the HARQ-ACK codebook, when a receiving end receives a PDCCH and the value of the DAI counter of the PDCCH is equal to the value of the DAI counter of the last PDCCH corresponding to the HARQ-ACK codebook (the last PDCCH corresponding to the HARQ-ACK codebook herein is the simple description of the last PDCCH of PDCCHs corresponding to at least one PDSCH corresponding to the HARQ-ACK codebook, the same below), the receiving end considers this PDCCH as the first PDCCH, which is used for changing the resource for the HARQ-ACK codebook.

In an embodiment, except for the DAI counter, parameters in the UL grant are valid parameters.

Other valid parameters in the first PDCCH may still maintain their original indication functions.

In an embodiment, in a case where the signal is the HARQ-ACK codebook, a transmission mode of HARQ-ACK information corresponding to a PDSCH scheduled by the first PDCCH is: concatenating the HARQ-ACK information corresponding to the PDSCH scheduled by the first PDCCH onto the end of the HARQ-ACK codebook.

Alternatively, in a case where the signal is the HARQ-ACK codebook and includes HARQ-ACK information corresponding to a semi-persistent scheduling physical downlink shared channel (SPS PDSCH), a transmission mode of HARQ-ACK information corresponding to the PDSCH scheduled by the first PDCCH is: concatenating the HARQ-ACK information corresponding to the PDSCH scheduled by the first PDCCH after a first type of HARQ-ACK information and before a second type of HARQ-ACK information; where the first type of HARQ-ACK information is HARQ-ACK information corresponding to a PDSCH scheduled by a PDCCH in the HARQ-ACK codebook, and the second type of HARQ-ACK information is HARQ-ACK information corresponding to an SPS PDSCH corresponding to the HARQ-ACK codebook.

Figure 4:
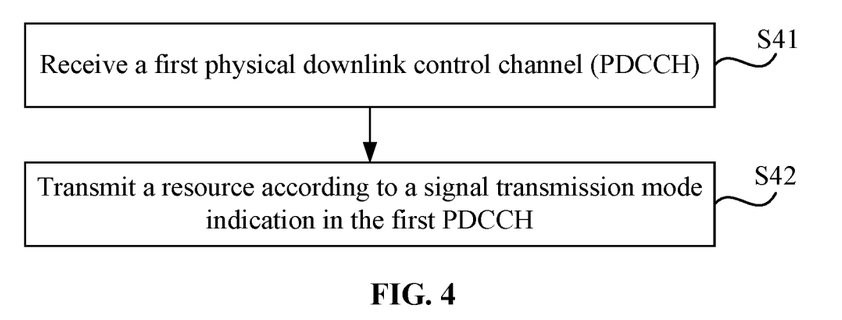
FIG. 4 is a flowchart of a signal transmission method according to another embodiment of the present application.

FIG. 4 is a flowchart of a signal transmission method according to another embodiment of the present application. As shown in FIG. 4, the method may include S41 and S42.

In S41, a first PDCCH is received.

In S42, a resource is transmitted according to a signal transmission mode indication in the first PDCCH.

The first PDCCH is used for indicating a change in a resource for the signal.

In an embodiment, the resource includes at least one of: a time domain resource used by the signal, a frequency domain resource used by the signal, a codeword resource used by the signal or a beam resource used by the signal.

The time domain resource includes at least one of: a slot location, a sub-slot location or a symbol location, and the frequency domain resource includes at least one of: a PRB location, a BWP location or a carrier location.

In an embodiment, the signal includes one of: a HARQ-ACK codebook, an SR, CSI or UE data.

In an embodiment, in a case where the signal is the HARQ-ACK codebook, the value of a DAI counter of the first PDCCH is set to the value of a DAI counter of a second PDCCH.

The second PDCCH is the last PDCCH of PDCCHs corresponding to at least one PDSCH corresponding to the HARQ-ACK codebook In an embodiment, except for the DAI counter, parameters in the first PDCCH are valid parameters (for example, except for the above-mentioned reinterpreted parameters, parameters in the DCI for scheduling the PUSCH in TS38.212Vf50 version, in particular, a PUCCH resource indicator and a PDSCH-to-HARQ feedback timing indicator).

In an embodiment, in a case where the signal is the HARQ-ACK codebook, the sending mode of the HARQ-ACK information corresponding to the PDSCH scheduled by the first PDCCH is as follows.

The HARQ-ACK information corresponding to the PDSCH scheduled by the first PDCCH is concatenated onto the end of the HARQ-ACK codebook.

In an embodiment, in a case where the signal is the HARQ-ACK codebook and includes HARQ-ACK information corresponding to an SPS PDSCH, the sending mode of the HARQ-ACK information corresponding to the PDSCH scheduled by the first PDCCH is as follows.

The HARQ-ACK information corresponding to the PDSCH scheduled by the first PDCCH is concatenated after a first type of HARQ-ACK information and before a second type of HARQ-ACK information; where the first type of HARQ-ACK information is HARQ-ACK information corresponding to a PDSCH scheduled by a PDCCH in the HARQ-ACK codebook, and the second type of HARQ-ACK information is HARQ-ACK information corresponding to an SPS PDSCH corresponding to the HARQ-ACK codebook.

The below are embodiments of the present application.

Embodiment One

It is assumed that a UE needs to transmit a HARQ-ACK codebook that is denoted as HARQ-ACK codebook 0 for ease of description. HARQ-ACK codebook 0 is instructed by a base station to be transmitted in slot n via a PUCCH that is denoted as PUCCH0 for ease of description. Another HARQ-ACK codebook is also instructed by the base station to be transmitted in slot n via a PUCCH (denoted as PUCCH1 for ease of description), where this HARQ-ACK codebook is denoted as HARQ-ACK codebook 1 for ease of description. PUCCH0 and PUCCH1 overlap in the time domain, where the overlapping in the time domain herein includes partially overlapping in the time domain. It is assumed that HARQ-ACK codebook 0 corresponds to the PDSCH for the eMBB traffic transmission or is a HARQ-ACK codebook that is considered to have a low priority and requires the change of the transmission mechanism and/or the resource. It is assumed that HARQ-ACK codebook 1 corresponds to the PDSCH for the URLLC traffic transmission or is a HARQ-ACK codebook that is considered to have a high priority and does not require the change of the transmission mechanism and/or the resource. According to the assumption described above, if the transmission mechanism and/or the resource for the HARQ-ACK codebook 0 need to be changed, the operation is performed according to the method described in this embodiment.

On the base station side, since the transmission mechanisms and resources for all HARQ-ACK codebooks are configured by the base station, when the base station uses the resource that is used for HARQ-ACK codebook 1, the base station has already known that HARQ-ACK codebook 1 will overlap with HARQ-ACK codebook 0 in the time domain. Therefore, the base station may transmit a UL grant before the transmission of HARQ-ACK codebook 0, and instruct to change the original transmission mechanism and/or resource for HARQ-ACK codebook 0 by using the agreed values of parameters in the UL grant, so that HARQ-ACK codebook 0 is transmitted according to the indication of the UL grant. After the UE side detects the UL grant, the UE considers that the HARQ-ACK codebook with a low priority between the two HARQ-ACK codebooks that overlap with each other in the time domain, that is, HARQ-ACK codebook 0, needs to be transmitted according to the transmission mechanism and/or the resource indicated by the UL grant, and the originally planned transmission mechanism and/or the resource are discarded. Alternatively, after the UE side receives the UL grant, the UE side considers that one HARQ-ACK codebook needs to be transmitted according to the transmission mechanism and/or the resource indicated by the UL grant, and the transmission mechanism and/or the resource originally planned for this HARQ-ACK codebook are discarded.

In this embodiment, the transmission mechanism of the HARQ-ACK codebook may include transmission of the HARQ-ACK codebook through a PUCCH or transmission of the HARQ-ACK codebook through a PUSCH. The resource for the HARQ-ACK codebook may include the location of a UL slot in which the HARQ-ACK codebook is transmitted and/or a PUCCH resource by which the HARQ-ACK codebook is transmitted. For example, the UL slot of a low-priority HARQ-ACK codebook may be changed, for example, to another slot, or the UL slot of the low-priority HARQ-ACK codebook is possibly not changed and just the PUCCH resource is changed, so that the new PUCCH used for transmitting the low-priority codebook and the PUCCH used for transmitting the high-priority HARQ-ACK codebook are in one UL slot but do not overlap in the time domain. In another example, both the UL slot and PUCCH resource for the low-priority HARQ-ACK codebook may also be changed. The change may be performed according to the indication of the parameters in the UL grant.

In a specific example, a UL grant, which is used for indicating the change of the transmission mechanism and/or the resource for a HARQ-ACK codebook, may be identified in two modes.

In the first mode, the base station and the UE agree to, through the values of parameters in the UL grant, for example, by reinterpreting the values of the combination of parameters UL-SCH indicator and CSI request in the UL grant, for example, the value of the UL-SCH indicator being 0 and the values of the CSI request being all 0 indicate that the UL grant has at least one purpose, that is, it requires changing the original transmission mechanism and/or resource for HARQ-ACK codebook 0. In this mode, the UE may transmit HARQ-ACK codebook 0 in the configured PUSCH resource in the UL grant and in the UL slot where the PUSCH resource is located. That is, HARQ-ACK codebook 0 is transmitted in a PUSCH, and there is no UE data in the PUSCH at this point.

In the second mode, the base station and the UE agree to identify the UL grant through the values of parameters in the UL grant. For example, the related parameters in the UL grant are reinterpreted in the following four interpretation modes.

In interpretation mode one, the RV is 2 bits, and one of four value states "00", "01", "10" and "11" of the RV is agreed to be used for representing that the UL grant requires at least the change of the original transmission mechanism and/or resource for HARQ-ACK codebook 0.

In interpretation mode two, one bit of the RV in the UL grant is agreed, and one of two value states "1" and "0" of this bit is agreed to be used for representing that the UL grant requires at least the change of the original transmission mechanism and/or resource for HARQ-ACK codebook 0.

In interpretation mode three, the HARQ-ID is 4 bits, one or more bits in the HARQ-ID are agreed to be used, and one of the multiple value states of the one or more bits is agreed to be used for representing that the UL grant requires at least the change of the original transmission mechanism and/or resource for HARQ-ACK codebook 0.

In interpretation mode four, the total length of the RV and the HARQ-ID is 6 bits, one or more bits in the 6 bits are agreed to be used, and one of the multiple value states of the one or more bits is agreed to be used for representing that the UL grant requires at least the change of the original transmission mechanism and/or resource for HARQ-ACK codebook 0.

The other parameters in the UL grant still maintain their original meanings and are valid and do not need to be reinterpreted. According to the indication in the UL grant, the UE transmits HARQ-ACK codebook 0. At this point, HARQ-ACK codebook 0 is transmitted through the PUSCH indicated by the UL grant and there is no uplink data. The original PUCCH0 transmission mechanism and resource for HARQ-ACK codebook 0 are discarded.

When the UL slot in the above-described Embodiment one may be replaced with a UL sub-slot, the signal transmission method described in this embodiment is still applicable.

Embodiment one is described by using the example where PUCCHs corresponding to two HARQ-ACK codebooks overlap in the time domain, and the transmission mechanism and/or resource that are planned to be discarded and correspond to the HARQ-ACK codebook are changed. The method is also applicable to the case where there is only one HARQ-ACK codebook, and the transmission mechanism and/or resource originally planned for this HARQ-ACK codebook may also be changed in the modes described in Embodiment one. This method is also applicable to the case where PUCCHs corresponding to more than two HARQ-ACK codebooks overlap in the time domain. The method is also applicable to the case where the PUCCH channel of the HARQ-ACK codebook of one UE overlaps with other channels of the UE or the case where the PUCCH cannot be sent due to the change of frame structure. For example, for a UE, the PUCCH channel of the HARQ-ACK codebook overlaps the PUSCH channel, or the PUCCH cannot to be sent due to the dynamical adjustment of the uplink or downlink attribute of the slot or symbol. In these cases, the transmission mechanism and/or resource for transmitting the HARQ-ACK codebook may be changed in this method, so that the HARQ-ACK codebook is transmitted by adopting the changed transmission mechanism or resource. Similarly, the signal transmission method provided in Embodiment one is also applicable to the change of the transmission mechanism and/or resource originally planned for transmitting other data or channels (for example, a PUSCH or a PDSCH.).

Embodiment Two

It is assumed that the UE needs to transmit one HARQ-ACK codebook that is instructed by the base station to be transmitted in slot n via a PUCCH, where this HARQ-ACK codebook is denoted as HARQ-ACK codebook 0 and this PUCCH is denoted as PUCCH0 for ease of description. Another HARQ-ACK codebook of the UE is also instructed by the base station to be transmitted in slot n via a PUCCH, where the another HARQ-ACK codebook is denoted as HARQ-ACK codebook 1 and the corresponding PUCCH is denoted as PUCCH1 for ease of description. PUCCH0 and PUCCH1 overlap in the time domain. HARQ-ACK codebook 0 may correspond to the PDSCH for the eMBB traffic transmission or is a HARQ-ACK codebook that is considered to have a low priority and requires the change of the resource. HARQ-ACK codebook 1 may correspond to the PDSCH for the URLLC traffic transmission or is a HARQ- ACK codebook that is considered to have a high priority and does not require the change of the resource. According to the assumption described above, if the resource for HARQ-ACK codebook 0 needs to be changed, the change is performed according to the method described in this embodiment.

Since the resources for all HARQ-ACK codebooks are configured by the base station, when the base station transmits the resource for HARQ-ACK codebook 1, the base station has already known that HARQ-ACK codebook 1 will overlap with HARQ-ACK codebook 0 in the time domain, or the base station needs to change the resource for HARQ-ACK codebook 0 due to other reasons. Therefore, the base station may transmit a first PDCCH before the transmission of HARQ-ACK codebook 0 and instruct to change the original resource used for transmitting HARQ-ACK codebook 0 by using an agreed value of a parameter in the first PDCCH, so that HARQ-ACK codebook 0 is transmitted according to the indication of the PDCCH, where the first PDCCH corresponds to a PDCCH for scheduling a PDSCH. After the UE side detects the first PDCCH, the UE considers that between the two HARQ-ACK codebooks that overlap with each other in the time domain, HARQ-ACK codebook 0 needs to be transmitted according to the resource indicated by the first PDCCH, and the originally planned resource is discarded. Alternatively, after the UE side receives the first PDCCH, the UE side considers that one HARQ-ACK codebook needs to be transmitted according to the resource indicated by the first PDCCH, and the resource originally planned for this HARQ-ACK codebook is discarded.

The resource for the HARQ-ACK codebook herein may include a UL slot location in which the HARQ-ACK codebook is transmitted and/or a PUCCH resource by which the HARQ-ACK codebook is transmitted. In an example, the UL slot for the low-priority HARQ-ACK codebook may also be changed into another UL slot. In another example, the UL slot for the low-priority HARQ-ACK codebook may not be changed and just the PUCCH resource for transmitting this codebook is changed, so that the new PUCCH used for transmitting the low-priority HARQ-ACK codebook and the PUCCH used for transmitting the high-priority HARQ-ACK codebook are in one UL slot but do not overlap in the time domain. In another example, both the UL slot and PUCCH resource for transmitting the HARQ-ACK codebook may be changed. The change may be performed according to the indication in the first PDCCH.

In this embodiment, the base station and the UE agree to, through the values of parameters in the first PDCCH, for example, 1, by setting the value of the DAI counter in the first PDCCH, indicate that at least one purpose of the first PDCCH is to require changing the original resource used for transmitting one HARQ-ACK codebook, and the new resource is also subject to the indication of the first PDCCH. Specifically, the purpose is indicated by setting the value of the DAI counter in the first PDCCH to be equal to the value of the DAI counter in the second PDCCH, which is the last PDCCH, corresponding to the HARQ-ACK codebook for which the resource is to be changed. The first PDCCH herein is allowed to schedule one PDSCH that may be with or without data.

That is, when a PDCCH is received by the UE side and the value of the DAI counter in the PDCCH is equal to the value of the DAI counter in the last PDCCH of the PDCCHs corresponding to a HARQ-ACK codebook, the UE considers the PDCCH as the first PDCCH, which is used for changing the resource for transmitting the HARQ-ACK codebook. For example, when the UE receives the first PDCCH and finds that the DAI counter value of the first PDCCH is equal to the DAI counter value of the second PDCCH, which is the last PDCCH, corresponding to HARQ-ACK codebook 0, the UE considers that the resource for transmitting HARQ-ACK codebook 0 has been changed, and the new resource for transmitting HARQ-ACK codebook 0 is subject to the indication of the received first PDCCH.

In an embodiment, if the PDSCH scheduled in the first PDCCH has data, the HARQ-ACK information corresponding to the PDSCH scheduled by the first PDCCH is combined with HARQ-ACK codebook 0 to form a new HARQ-ACK codebook and then the new HARQ-ACK codebook is transmitted in the PUCCH resource indicated by the first PDCCH. If the PDSCH scheduled in the first PDCCH has no data, then only HARQ-ACK codebook 0 is transmitted in the PUCCH resource indicated by the first PDCCH.

In an embodiment, if the PDSCH scheduled in the first PDCCH has data, the HARQ-ACK information corresponding to the PDSCH scheduled by the first PDCCH is combined with HARQ-ACK codebook 0 to form a new HARQ-ACK codebook and then the new HARQ-ACK codebook is transmitted in the PUCCH resource indicated by the first PDCCH. The specific operation may be as follows: the HARQ-ACK information corresponding to the PDSCH scheduled by the first PDCCH is concatenated onto the end of the HARQ-ACK codebook information corresponding to a PDSCH dynamically scheduled by a PDCCH in HARQ-ACK codebook 0, regardless of whether the HARQ-ACK information corresponding to an SPS PDSCH exists in HARQ-ACK codebook 0.

In an embodiment, if the PDSCH scheduled in the first PDCCH has data, the HARQ-ACK information corresponding to the PDSCH scheduled by the first PDCCH is combined with HARQ-ACK codebook 0 to form a new HARQ-ACK codebook and then the new HARQ-ACK codebook is transmitted in the PUCCH resource indicated by the first PDCCH. The specific operation may also be as follows: if the HARQ-ACK information corresponding to the SPS PDSCH exists in HARQ-ACK codebook 0, the HARQ-ACK information corresponding to the PDSCH scheduled by the first PDCCH is after the HARQ-ACK information corresponding to the PDSCH dynamically scheduled by the PDCCH in HARQ-ACK codebook 0 and before the HARQ-ACK information corresponding to the SPS PDSCH in HARQ-ACK codebook 0.

In this embodiment, the base station uses the agreed values of parameters in a downlink PDCCH to indicate to the UE the change in the resource for transmitting a HARQ-ACK codebook, and meanwhile, presents a new resource in the PDCCH.

The other parameters in the first PDCCH still maintain their original meanings and are valid and do not need to be reinterpreted. The UE then transmits HARQ-ACK codebook 0 in the PUCCH resource indicated by the first PDCCH according to the indication in the first PDCCH. The original PUCCH0 resource for HARQ-ACK codebook 0 is discarded.

When the UL slot in the above-described Embodiment two may be replaced with a UL sub-slot, the signal transmission method described in this embodiment is still applicable.

Embodiment two is described by using the example where the PUCCHs corresponding to two HARQ-ACK codebooks overlap in the time domain, and the transmission mechanism and/or resource that are planned to be discarded and correspond to the HARQ-ACK codebook are changed. The method is also applicable to the case where there is only one HARQ-ACK codebook, that is, the transmission of this HARQ-ACK codebook does not overlap with the transmission of other HARQ-ACK codebooks in the time domain, and the transmission mechanism and/or resource originally planned for this HARQ-ACK codebook may also be changed in the manners described above. This method is also applicable to the case where PUCCHs corresponding to more than two HARQ-ACK codebooks overlap in the time domain. The method is also applicable to the case where the PUCCH channel of the HARQ-ACK codebook of one UE overlaps with another channel of the UE or the case where the PUCCH cannot be sent due to the change of frame structure. For example, the PUSCH channel and the PUCCH channel of the HARQ-ACK codebook of the same UE overlap, or the PUCCH cannot be sent due to the dynamical adjustment of the uplink or downlink attribute of the slot or symbol. In these cases, the transmission mechanism and/or resource for transmitting the HARQ-ACK codebook may be changed in this method, so that the HARQ-ACK codebook is transmitted by adopting the changed transmission mechanism or resource. Similarly, the signal transmission method provided in Embodiment one is also applicable to the change of the transmission mechanism and/or resource originally planned for transmitting other data or channels (for example, a PUSCH or a PDSCH).

Embodiment Three

In the related art, if the base station configures the value of the beta_offsets used when the uplink control information (UCI, including one or more of HARQ-ACK, CSI or SR) is transmitted in a PUSCH, with reference to the following high-layer signaling structure (in TS38.331, parameter UCI-OnPUSCH), the beta_offsets specifically includes a dynamic parameter denoted as dynamic or a semi-static parameter denoted as semiStatic, and only one of them may be selected to configure. When the betaoffsets is configured as the dynamic parameter, that is, dynamic, the betaoffsets will have four values. When the beta_offsets is configured as the semi-static parameter, that is, semiStatic, the beta_offsets will have only one value. The specific one of the four values to be used is indicated by the beta_offset indicator field in the PDCCH.

In addition, the definition of the PDCCH mainly involves two types of PDCCHs for scheduling the PUSCH, which are denoted as DCI0-0 and DCI0-1 respectively, where DCI0-0 corresponds to less total bits and generally corresponds to higher reliability and has lower actual bit rate during transmission, and the main use scenarios include cell edge. Therefore, the parameter beta_offset indicator field is not set in DCI0-0. DCI0-1 has more total bits and a higher dense code rate. The parameter beta_offset indicator field is set in DCI0-1.

In addition, in the related art, there are also rules that if DCI0-1 without beta_offset indicator field or DCI0-0 schedules the PUSCH, the UE uses the beta_offsets configured by the high-layer signaling.

Through the analysis herein, it is considered that based on the related art, there will be the following problems. If the beta_offsets configured by the high-layer signaling is semi-Static, the beta_offsets has only one value at this point, and the UE may use this value directly. If the beta_offsets configured by the high-layer signaling is dynamic, the beta_offsets has four values at this point, and the UE may determine the value by adopting one of the following schemes.

The base station and the UE agree that for the PUSCH scheduled by DCI0-0, the UE adopts the default or predefined betaoffset value for the UCI transmitted in the PUSCH. For example, regardless of whether the betaoffsets configured by the radio resource control (RRC) signaling is dynamic or semi-static, if the UE wants to transmit the UCI in the PUSCH scheduled by DCI0-0, the UE uses the default or predefined betaoffset. The base station side also considers that when the UCI is transmitted in the PUSCH scheduled by DCI0-0, the UE uses the default or predefined betaoffset. The advantage of the above operation is that even when the RRC configuration signaling is ambiguous, the UE may also use a determined betaoffset value when the UE transmits the UCI in the PUSCH scheduled by DCI0-0. In this scheme, the beta_offset value does not change, and in different scenarios, for example, at the edge of the cell and the center of the cell, only the same betaoffset value can be used. Obviously, the flexibility of the value of the betaoffset is very poor, which leads to low UCI transmission efficiency.

The base station and the UE agree that when the beta_offsets configured by the RRC signaling is dynamic and four values of the beta_offset are configured, if the UE transmits the UCI in the PUSCH scheduled by DCI0-0, one of the four values of the dynamic beta_offset is used as the value of the beta_offset for transmitting the UCI in the PUSCH. Specifically, the base station and the UE agree to use the first one of the four values of the dynamic beta_offset or use the largest one of the four values of the dynamic beta_offset or use the second-lowest one of the four values of the dynamic beta_offset. Mainly given that one of the usage scenarios of DCI0-0 is cell edge coverage, the largest value of the beta_offset is used. In this manner, the use of the largest value can guarantee the signaling of the UCI, that is, the code rate is the lowest during UCI transmission, but the performance of the PUSCH is sacrificed, which makes the PUSCH performance the worst. Mainly given a compromise under the first scheme, the second-lowest beta_offset value is used. In this manner, the performance of the UCI used is second best, so that the performance of the PUSCH is better than the worst performance, and when this scheme is used, the beta_offset is determined by adopting the following scheme, that is, when the RRC is ambiguous, the previous and most recently used beta_offset value is used. At this point, the UE needs to save the previously and recently used beta_offset values for use when the RRC is ambiguous.

The base station and the UE agree that when the beta_offsets configured by the RRC signaling is dynamic and four values of the beta_offsets are configured, if the UE transmits the UCI in the PUSCH scheduled by DCI0-0, the UE adopts the default or predefined beta_offset value for transmitting the UCI in the PUSCH. For example, regardless of whether the beta_offsets configured by the RRC signaling is dynamic or semi-static, if the UE is required to transmit the UCI in the PUSCH scheduled by DCI0-0, the UE uses the default or predefined beta_offset. The base station side also considers that when the UCI is transmitted in the PUSCH scheduled by DCI0-0, the UE uses the default or predefined beta_offset. The advantage of the above operation is that even when the RRC configuration signaling is ambiguous, the UE may also use a determined beta_offset value when the UE transmits the UCI in the PUSCH scheduled by DCI0-0. Compared with the first scheme, this scheme means that if the betaoffsets configured by the RRC signaling is semi-static, the UE can use the RRC-configured semi-static betaoffset value when the UE transmits the UCI in the PUSCH scheduled by DCI0-0. The beta_offset value may be changed semi-statically, thereby achieving certain flexibility of the beta_offset value. Based on this scheme, the default or predefined beta_offset value is used directly if the RRC is ambiguous.

Figure 5:
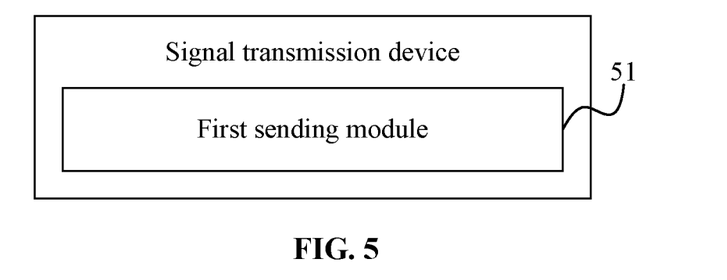
FIG. 5 is a structural schematic diagram of a signal transmission device according to an embodiment of the present application.

FIG. 5 is a structural schematic diagram of a signal transmission device according to an embodiment of the present application. The signal transmission device includes a first sending module 51.

The first sending module 51 is configured to send a UL grant.

The UL grant is used for indicating a change in a transmission mechanism of the signal and/or a change in a resource for the signal.

In an embodiment, the UL-SCH indicator in the UL grant is 0, and the CSI request in the UL grant is 0.

In an embodiment, except for the RV and the HARQ-ID, parameters in the UL grant are valid parameters.

In an embodiment, the transmission mechanism includes at least one of: transmission of the signal through a PUCCH or transmission of the signal through a PUSCH.

The resource includes at least one of: a time domain resource used by the signal, a frequency domain resource used by the signal, a codeword resource used by the signal or a beam resource used by the signal.

The time domain resource includes at least one of: a slot location, a sub-slot location or a symbol location, and the frequency domain resource includes at least one of: a PRB location, a BWP location or a carrier location.

In an embodiment, the signal includes one of: a HARQ-ACK codebook, an SR, CSI or UE data.

In an embodiment, in a case where the signal is the HARQ-ACK codebook, the UL grant is used for indicating that the transmission of the HARQ-ACK codebook through a PUCCH is changed into the transmission of the HARQ-ACK codebook through a PUSCH scheduled by the UL grant.

Figure 6:
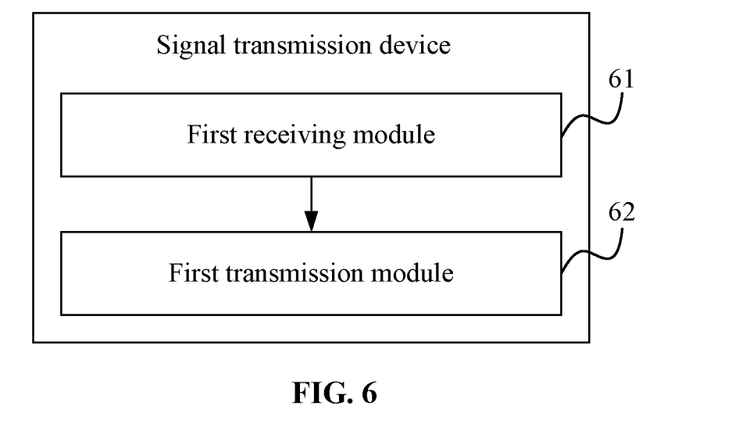
FIG. 6 is a structural schematic diagram of a signal transmission device according to another embodiment of the present application.

FIG. 6 is a structural schematic diagram of a signal transmission device according to an embodiment of the present application. The signal transmission device includes a first receiving module 61 and a first transmission module 62.

The first receiving module 61 is configured to receive a UL grant.

The first transmission module 62 is configured to transmit a signal according to the UL grant.

The UL grant is used for indicating a change in a transmission mechanism of the signal and/or a change in a resource for the signal.

In an embodiment, the UL-SCH indicator in the UL grant is 0, and the CSI request in the UL grant is 0.

In an embodiment, except for the RV and the HARQ-ID, parameters in the UL grant are valid parameters.

In an embodiment, the transmission mechanism includes at least one of: transmission of the signal through a PUCCH or transmission of the signal through a PUSCH.

The resource includes at least one of: a time domain resource used by the signal, a frequency domain resource used by the signal, a codeword resource used by the signal or a beam resource used by the signal.

The time domain resource includes at least one of: a slot location, a sub-slot location or a symbol location, and the frequency domain resource includes at least one of: a PRB location, a BWP location or a carrier location.

In an embodiment, the signal includes one of: a HARQ-ACK codebook, an SR, CSI or UE data.

In an embodiment, in a case where the signal is the HARQ-ACK codebook, the UL grant is used for indicating that the transmission of the HARQ-ACK codebook through a PUCCH is changed into the transmission of the HARQ-ACK codebook through a PUSCH scheduled by the UL grant.

Figure 7:
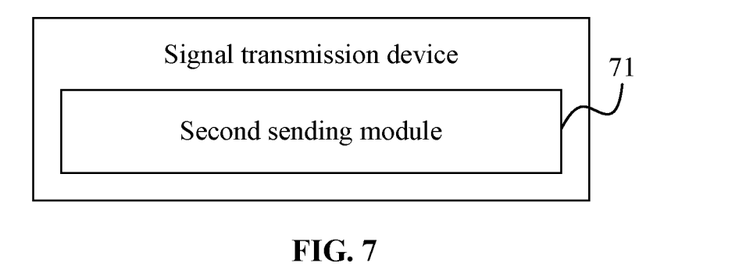
FIG. 7 is a structural schematic diagram of a signal transmission device according to another embodiment of the present application.

FIG. 7 is a structural schematic diagram of a signal transmission device according to an embodiment of the present application. The signal transmission device includes a second sending module 71.

The second sending module 71 is configured to send a first PDCCH.

The first PDCCH is used for indicating a change in a resource for the signal.

In an embodiment, the resource includes at least one of: a time domain resource used by the signal, a frequency domain resource used by the signal, a codeword resource used by the signal or a beam resource used by the signal.

The time domain resource includes at least one of: a slot location, a sub-slot location or a symbol location, and the frequency domain resource includes at least one of: a PRB location, a BWP location or a carrier location.

In an embodiment, the signal includes one of: a HARQ-ACK codebook, an SR, CSI or UE data.

In an embodiment, in a case where the signal is the HARQ-ACK codebook, the value of a DAI counter of the first PDCCH is set to the value of a DAI counter of a second PDCCH.

The second PDCCH is the last PDCCH of PDCCHs corresponding to at least one PDSCH corresponding to the HARQ-ACK codebook.

In an embodiment, except for the DAI counter, parameters in the UL grant are valid parameters.

In an embodiment, in a case where the signal is the HARQ-ACK codebook, a transmission mode of HARQ-ACK information corresponding to a PDSCH scheduled by the first PDCCH is: concatenating the HARQ-ACK information corresponding to the PDSCH scheduled by the first PDCCH onto the end of the HARQ-ACK codebook.

Alternatively, in a case where the signal is the HARQ-ACK codebook and includes HARQ-ACK information corresponding to an SPS PDSCH, a transmission mode of HARQ-ACK information corresponding to the PDSCH scheduled by the first PDCCH is: concatenating the HARQ-ACK information corresponding to the PDSCH scheduled by the first PDCCH after a first type of HARQ-ACK information and before a second type of HARQ-ACK information; where the first type of HARQ-ACK information is HARQ-ACK information corresponding to a PDSCH scheduled by a PDCCH in the HARQ-ACK codebook, and the second type of HARQ-ACK information is HARQ-ACK information corresponding to an SPS PDSCH corresponding to the HARQ-ACK codebook.

Figure 8:
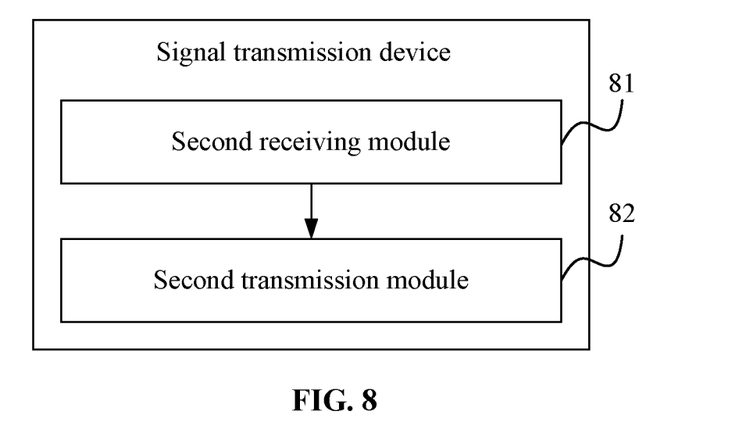
FIG. 8 is a structural schematic diagram of a signal transmission device according to another embodiment of the present application.

FIG. 8 is a structural schematic diagram of a signal transmission device according to an embodiment of the present application. The signal transmission device includes a second receiving module 81 and a second transmission module 82.

The second receiving module 81 is configured to receive a first PDCCH.

The second transmission module 82 is configured to transmit a resource according to a signal transmission mode indication in the first PDCCH.

The first PDCCH is used for indicating a change in a resource for the signal.

In an embodiment, the resource includes at least one of: a time domain resource used by the signal, a frequency domain resource used by the signal, a codeword resource used by the signal or a beam resource used by the signal.

The time domain resource includes at least one of: a slot location, a sub-slot location or a symbol location, and the frequency domain resource includes at least one of: a PRB location, a BWP location or a carrier location.

In an embodiment, the signal includes one of: a HARQ-ACK codebook, an SR, CSI or UE data.

In an embodiment, in a case where the signal is the HARQ-ACK codebook, the value of a DAI counter of the first PDCCH is set to the value of a DAI counter of a second PDCCH.

The second PDCCH is the last PDCCH of PDCCHs corresponding to at least one PDSCH corresponding to the HARQ-ACK codebook.

In an embodiment, except for the DAI counter, parameters in the UL grant are valid parameters.

In an embodiment, a sending mode of HARQ-ACK information corresponding to a PDSCH scheduled by the first PDCCH is: concatenating the HARQ-ACK information corresponding to the PDSCH scheduled by the first PDCCH onto the end of the HARQ-ACK codebook. The second sending module has been described in the above-mentioned embodiments.

In an embodiment, in a case where the signal is the HARQ-ACK codebook and includes HARQ-ACK information corresponding to an SPS PDSCH, a sending mode of HARQ-ACK information corresponding to the PDSCH scheduled by the first PDCCH is: concatenating the HARQ-ACK information corresponding to the PDSCH scheduled by the first PDCCH after a first type of HARQ-ACK information and before a second type of HARQ-ACK information; where the first type of HARQ-ACK information is HARQ-ACK information corresponding to a PDSCH scheduled by a PDCCH in the HARQ-ACK codebook, and the second type of HARQ-ACK information is HARQ-ACK information corresponding to an SPS PDSCH corresponding to the HARQ-ACK codebook. The second sending module 71 has been described in the above-mentioned embodiments.

In this embodiment of the present application, for the function of each module in each device, reference is made to the corresponding description in the method embodiments described above, and details are not repeated here.

Figure 9:
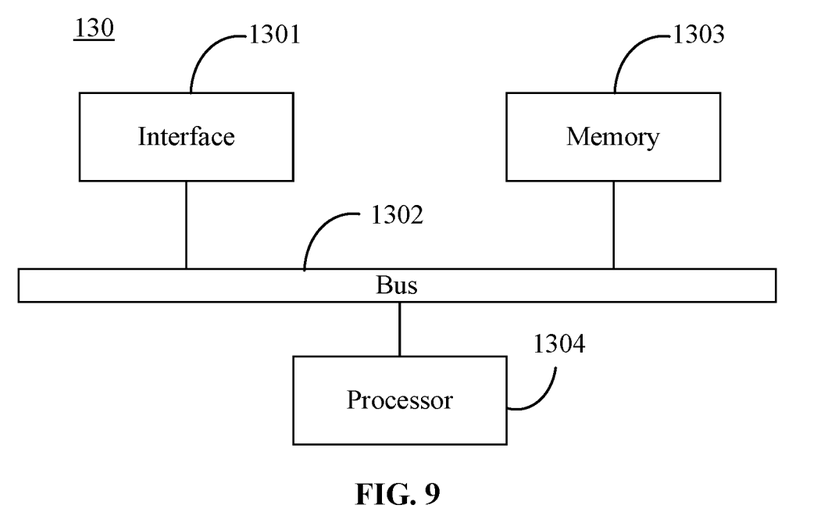
FIG. 9 is a structural schematic diagram of a terminal according to an embodiment of the present application.

FIG. 9 is a structural schematic diagram of a terminal according to an embodiment of the present application. As shown in FIG. 9, the terminal 130 provided by this embodiment of the present application includes a memory 1303 and a processor 1304. The terminal 130 may further include an interface 1301 and a bus 1302. The interface 1301, the memory 1303 and the processor 1304 are connected via the bus 1302. The memory 1303 is configured to store instructions. The processor 1304 is configured to read the instructions to execute the technical solutions of the above method embodiments applied to the terminal. The implementation principles and technical effects of the processor are similar to those of the method embodiments, and details are not repeated here.

Figure 10:
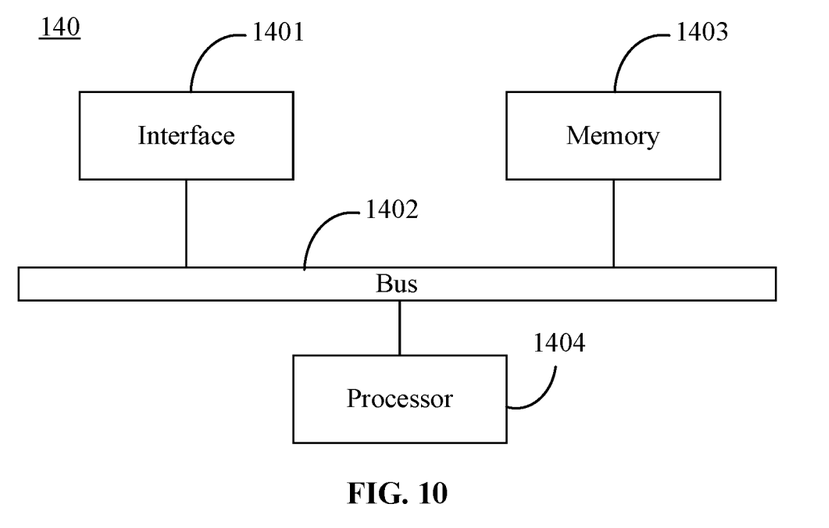
FIG. 10 is a structural schematic diagram of a base station according to an embodiment of the present application.

FIG. 10 is a structural schematic diagram of a base station according to an embodiment of the present application. As shown in FIG. 10, the base station 140 provided by this embodiment of the present application includes a memory 1403 and a processor 1404. The base station may further include an interface 1401 and a bus 1402. The interface 1401, the memory 1403 and the processor 1404 are connected via the bus 1402. The memory 1403 is configured to store instructions. The processor 1404 is configured to read the instructions to execute the technical solutions of the above method embodiments applied to the base station. The implementation principles and technical effects of the processor are similar to those of the method embodiments, and details are not repeated here.

Figure 11:
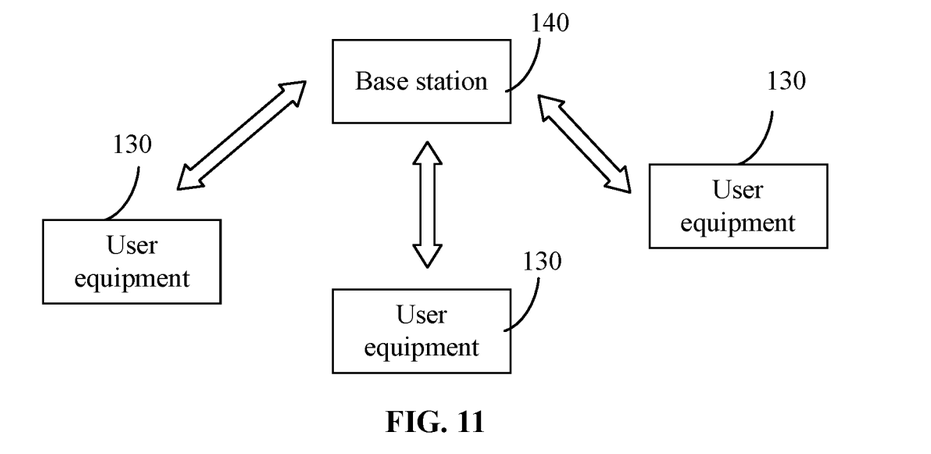
FIG. 11 is a structural schematic diagram of a communication system according to an embodiment of the present application.

FIG. 11 is a structural schematic diagram of a communication system according to an embodiment of the present application. As shown in FIG. 11, the system includes the terminal 130 described in the above embodiments and the base station 140 described in the above embodiments. The communication system provided by this embodiment of the present application incudes, but is not limited to, a Long Term Evolution (LTE) system, an LTE frequency division duplex (FDD) system, an LTE time division duplex (TDD) system, a universal mobile telecommunication system (UMTS), a 5G system, etc.

The above are only exemplary embodiments of the present application and are not intended to limit the scope of the present application.

In general, various embodiments of the present application may be implemented in hardware, a dedicated circuit, software, logic, or any combination thereof. For example, some aspects may be implemented in hardware while other aspects may be implemented in firmware or software that may be executed by a controller, a microprocessor, or other computing apparatuses, which is not limited thereto.

This embodiments of the present application may be implemented by a data processor of a mobile apparatus executing computer program instructions, such as in a processor entity, or by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in drawings of the present application may represent program steps, or may represent interconnected logic circuits, modules, and functions, or may represent a combination of programs, logic circuits, modules, and functions. The computer programs may be stored in a memory. The memory may be of any type suitable for the local technical environment and may be implemented by using any suitable data storage technology. The memory 93 provided by this embodiment of the present application may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EE-PROM) or a flash memory. The volatile memory may be a random access memory (RAM), which serves as an external cache. The RAM may include various forms, such as a static RAM (SRAM), a dynamic RAM (DRAM), a synchronous DRAM (SDRAM), a double data rate SDRAM (DDR SDRAM), an enhanced SDRAM (ESDRAM), a synclink DRAM (SLDRAM), and a direct Rambus RAM (DR RAM). The memory of the system and the method described in the present application includes, but is not limited to, these and any other suitable types of memory.

The processor provided by the embodiments of the present application may be of any type suitable to the local technical environment, such as, but not limited to, a general-purpose computer, a special-purpose computer, a microprocessor, a digital signal processor (DSP), an application-specific integrated circuit (ASIC), a field programmable gate array (FPGA) or other programmable logic devices, a discrete gate or transistor logic, discrete hardware components, or a processor based on a multi-core processor architecture.

The general-purpose processor may be a microprocessor or may be any conventional processor. The processor described above may implement or execute various methods disclosed by the embodiments of the present application. The software modules may be located at a RAM, a flash memory, a ROM, a PROM, an EPROM, a register or other storage media. The storage medium is located in the memory. The processor reads information in the memory and implements the methods described above in combination with hardware of the processor.

What is claimed is:

1. A method for wireless communication, comprising:
    transmitting, by a base station to a user equipment on a physical downlink control channel (PDCCH), a Downlink Control Information (DCI) message that schedules no data, wherein an agreed value of 1 of a parameter in the DCI message indicates that the DCI message signals a change of a slot location from a first slot to a second slot for a transmission of a hybrid automatic repeat request acknowledgement (HARQ-ACK) codebook with a HARQ-ACK information, wherein a location of the first slot is discarded for the transmission of the HARQ-ACK codebook; and
    receiving, by the base station, the HARQ-ACK codebook from the user equipment according to the DCI message.

2. The method of claim 1, wherein the HARQ-ACK codebook is transmitted on a Physical Uplink Control Channel (PUCCH).

3. The method of claim 1, wherein the HARQ-ACK codebook is combined with a second HARQ-ACK codebook with second HARQ-ACK information.

4. The method of claim 1, wherein the DCI message indicates information for determining the second slot for the transmission of the HARQ-ACK codebook.

5. A method for wireless communication, comprising:
    receiving, by a user equipment from a base station, on a physical downlink control channel (PDCCH), a Downlink Control Information (DCI) message that schedules no data, wherein an agreed value of 1 of a parameter in the DCI message indicates that the DCI message signals a change of a slot location from a first slot to a second slot for a transmission of a hybrid automatic repeat request acknowledgement (HARQ-ACK) codebook with a HARQ-ACK information, wherein a location of the first slot is discarded for the transmission of the HARQ-ACK codebook; and
    transmitting, by the user equipment, the HARQ-ACK codebook to the base station according to the DCI message.

6. The method of claim 5, comprising:
    transmitting, by the user equipment, the HARQ-ACK codebook on a Physical Uplink Control Channel (PUCCH).

7. The method of claim 5, comprising:
    combining, by the user equipment, the HARQ-ACK codebook with a second HARQ-ACK codebook with second HARQ-ACK information.

8. The method of claim 5, wherein the DCI message indicates information for determining the second slot for the transmission of the HARQ-ACK codebook.

9. A device for wireless communication, comprising one or more processors that are configured to:
    transmit, to a user equipment on a physical downlink control channel (PDCCH), a Downlink Control Information (DCI) message that schedules no data, wherein an agreed value of 1 of a parameter in the DCI message indicates that the DCI message signals a change of a slot location from a first slot to a second slot for a transmission of a hybrid automatic repeat request acknowledgement (HARQ-ACK) codebook with a HARQ-ACK information, wherein a location of the first slot is discarded for the transmission of the HARQ-ACK codebook; and
    receive the HARQ-ACK codebook from the user equipment according to the DCI message.

10. The device of claim 9, wherein the HARQ-ACK codebook is transmitted on a Physical Uplink Control Channel (PUCCH).

11. The device of claim 9, wherein the HARQ-ACK codebook is combined with a second HARQ-ACK codebook with second HARQ-ACK information.

12. The device of claim 9, wherein the DCI message indicates information for determining the second slot for the transmission of the HARQ-ACK codebook.

13. A device for wireless communication, comprising one or more processors that are configured to:
    receive, from a base station on a physical downlink control channel (PDCCH), a Downlink Control Information (DCI) message that schedules no data, wherein an agreed value of 1 of a parameter in the DCI message indicates that the DCI message signals a change of a slot location from a first slot to a second slot for a transmission of a hybrid automatic repeat request acknowledgement (HARQ-ACK) codebook with a HARQ-ACK information, wherein a location of the first slot is discarded for the transmission of the HARQ-ACK codebook; and
    transmit the HARQ-ACK codebook to the base station according to the DCI message.

14. The device of claim 13, wherein the one or more processors are configured to:
    transmit the HARQ-ACK codebook on a Physical Uplink Control Channel (PUCCH).

15. The device of claim 13, wherein the one or more processors are configured to:
    combine the HARQ-ACK codebook with a second HARQ-ACK codebook with second HARQ-ACK information.

16. The device of claim 13, wherein the DCI message indicates information for determining the second slot for the transmission of the HARQ-ACK codebook.

* * * * *